US012221733B2

(12) United States Patent
Jackson et al.

(10) Patent No.: US 12,221,733 B2
(45) Date of Patent: Feb. 11, 2025

(54) INKJET LOOM WEAVING MACHINE

(71) Applicant: Xerox Corporation, Norwalk, CT (US)

(72) Inventors: Warren Jackson, San Francisco, CA (US); Naveen Chopra, Oakville (CA); Steven E. Ready, Langley, WA (US); Karthik Gopalan, Berkeley, CA (US); Kent Evans, Sunnyvale, CA (US)

(73) Assignee: Xerox Corporation, Norwalk, CT (US)

( * ) Notice: Subject to any disclaimer, the term of this patent is extended or adjusted under 35 U.S.C. 154(b) by 595 days.

(21) Appl. No.: 17/454,912

(22) Filed: Nov. 15, 2021

(65) Prior Publication Data

US 2022/0074089 A1 Mar. 10, 2022

Related U.S. Application Data

(62) Division of application No. 16/177,679, filed on Nov. 1, 2018, now Pat. No. 11,186,929.

(51) Int. Cl.

| | |
|---|---|
| ***D06B 11/00*** | (2006.01) |
| ***B41J 2/14*** | (2006.01) |
| ***B41J 2/21*** | (2006.01) |
| ***B41J 3/407*** | (2006.01) |
| ***B41J 11/00*** | (2006.01) |
| ***B41J 15/04*** | (2006.01) |
| ***D03J 1/02*** | (2006.01) |
| ***D03J 1/04*** | (2006.01) |
| ***D06B 1/02*** | (2006.01) |

(Continued)

(52) U.S. Cl.

CPC ....... *D06B 11/0023* (2013.01); *B41J 2/14201* (2013.01); *B41J 2/2103* (2013.01); *B41J 3/4078* (2013.01); *B41J 11/002* (2013.01); *B41J 11/00214* (2021.01); *B41J 15/046* (2013.01); *D03J 1/02* (2013.01); *D03J 1/04* (2013.01); *D06B 1/02* (2013.01); *D06P 1/004* (2013.01); *D06P 5/30* (2013.01); *D03J 2700/02* (2013.01)

(58) Field of Classification Search

None

See application file for complete search history.

(56) References Cited

U.S. PATENT DOCUMENTS

| | | | |
|---|---|---|---|
| 1,384,940 | A | 7/1921 | Denison |
| 2,644,423 | A | 7/1953 | Bauer |

(Continued)

FOREIGN PATENT DOCUMENTS

| | | | | |
|---|---|---|---|---|
| GB | 2166766 A | | 5/1986 | |
| WO | WO-2016204687 A1 | * | 12/2016 | ................ D03J 1/04 |

(Continued)

OTHER PUBLICATIONS

U.S. Appl. No. 16/177,701, filed Nov. 1, 2018, Inkjet Loom Weaving Machine.

*Primary Examiner* — Rita P Adhlakha

(74) *Attorney, Agent, or Firm* — Fox Rothschild LLP

(57) ABSTRACT

A system for treatment of thread includes a weft thread printer having an intake positioned to receive a weft thread from a source, as well as an encoder that is configured to detect a length of the weft thread as the weft thread moves through the weft thread printer along a travel path. The system also includes a printhead positioned to apply coatings of a plurality of colors to the weft thread and yield a treated weft thread, as well as an outlet positioned to pass the treated weft thread to a loom.

19 Claims, 9 Drawing Sheets

(51) Int. Cl.

| | |
|---|---|
| ***D06P 1/00*** | (2006.01) |
| ***D06P 5/30*** | (2006.01) |

(56) References Cited

U.S. PATENT DOCUMENTS

| | | | | |
|---|---|---|---|---|
| 3,227,077 | A | 1/1966 | Farrer et al. | |
| 3,600,730 | A | 8/1971 | Evans | |
| 3,762,867 | A | 10/1973 | Crawford | |
| 4,308,716 | A | 1/1982 | Bauer | |
| 6,189,989 | B1 | 2/2001 | Hirabayashi et al. | |
| 6,328,078 | B1 | 12/2001 | Wildeman et al. | |
| 6,536,893 | B2 * | 3/2003 | Kowalski ............... | C09D 11/30 342/100 |
| 7,302,308 | B2 | 11/2007 | Kato et al. | |
| 8,833,283 | B2 | 9/2014 | Ferrarotti et al. | |
| 9,820,515 | B2 * | 11/2017 | Crockett, Jr. .......... | A41D 31/18 |
| 10,010,452 | B2 * | 7/2018 | Wenske .................. | A61F 13/00 |
| 10,525,734 | B1 | 1/2020 | Jackson et al. | |
| 2002/0059961 | A1 | 5/2002 | Corbiere | |
| 2003/0135931 | A1 | 7/2003 | Shaw | |
| 2004/0239705 | A1 | 12/2004 | Arikita | |
| 2006/0180041 | A1 | 8/2006 | Kadota | |
| 2011/0254896 | A1 | 10/2011 | Ferrarotti et al. | |
| 2018/0023225 | A1 | 1/2018 | Chamberlin et al. | |
| 2020/0123686 | A1 * | 4/2020 | Schnabel ............... | D03D 27/10 |

FOREIGN PATENT DOCUMENTS

| | | | |
|---|---|---|---|
| WO | 2017013651 | A1 | 1/2017 |
| WO | 2017200473 | A1 | 11/2017 |
| WO | 2017203524 | A1 | 11/2017 |

* cited by examiner

INKJET LOOM WEAVING MACHINE

CROSS-REFERENCE AND CLAIM OF PRIORITY

This patent document is a divisional of and claims priority to U.S. patent application Ser. No. 16/177,679 filed Nov. 1, 2018 which is incorporated herein by reference in its entirety.

BACKGROUND

The production of woven fabrics having varied colors and/or patterns has long been desired, with many different methods of manufacture being used to achieve these results. For example, in some implementations, a loom is provided with numerous spools of thread, with each spool containing thread of a specific color that may be selected and interwoven into the fabric where desired. In other implementations, a woven fabric may have a color, image, or pattern printed directly on a surface of the fabric to achieve a desired look.

In regard to weaving methods using numerous spools of different colored threads, the number of color combinations and the patterns achievable are limited by the number of distinct spools. For example, if a pattern to be woven requires 30 different colors, 30 different spools containing those colors must be accessible. As such, the spatial requirements of the loom increase based on the number of color options available, and the possible color variations are limited by the number of different colored thread spools. Furthermore, with each change in thread color, the motion of the weft thread shuttle is interrupted in order to apply the chosen color, thereby slowing production of the fabric and increasing the manufacturing costs. Additionally, while the weft threads may vary, the warp threads are often limited to a single color and/or a single pattern, thus limiting the possible color variations and/or patterns of a fabric produced by such a method.

As noted above, some implementations print various colors and/or patterns directly on a surface of the woven fabric. However, while printing directly on the surface of the fabric may overcome some of the limitations in color choice present in systems using different colored threads, there are still several drawbacks to printing on woven fabrics. One issue of such a system may involve the wicking of ink along the fibers of the fabric immediately after printing, which may degrade the quality of the image or other printed pattern. Another issue relates to the fact that the image or pattern is printed only on one side of the fabric, and adheres only to one surface of the fabric. Thus, if the fibers of the fabric move or stretch in any way, the quality of the image or pattern may degrade and/or become distorted. Furthermore, because the various colors of the image or pattern are only on one surface of the fabric (rather than surrounding, or being absorbed by, the fibers), the printed image or pattern may only be visible from one side of the fabric, and may be subject to wear over time.

Accordingly, there is a need for a system capable of producing woven fabrics with varied colors and/or patterns which addresses the issues described above.

SUMMARY

In accordance with an aspect of the disclosure, system for treatment of thread is disclosed. The system includes a weft thread printer. The weft thread printer includes an intake positioned to receive a weft thread from a source. The weft thread printer also may include an encoder that is configured to detect a length of the weft thread as the weft thread moves through the weft thread printer along a travel path. Additionally, the weft thread printer may include a printhead positioned to apply coatings of a plurality of colors to the weft thread and yield a treated weft thread. The weft thread printer may further include an outlet positioned to pass the treated weft thread to a loom.

According to another aspect of the disclosure, a system for treatment of thread is disclosed. The system may include a loom. The loom may include a warp beam configured to provide one or more warp threads. The loom may also include a shuttle that is configured to receive a weft thread from a weft thread source and weave the weft thread through the one or more warp threads. Furthermore, the loom may include a warp thread printer having a printhead and a plurality of ink containers that hold a plurality of colored inks. The printhead may be configured to move along the loom and apply the colored inks to the one or more warp threads to yield one or more treated warp threads of multiple colors.

DETAILED DESCRIPTION

Figure 1:
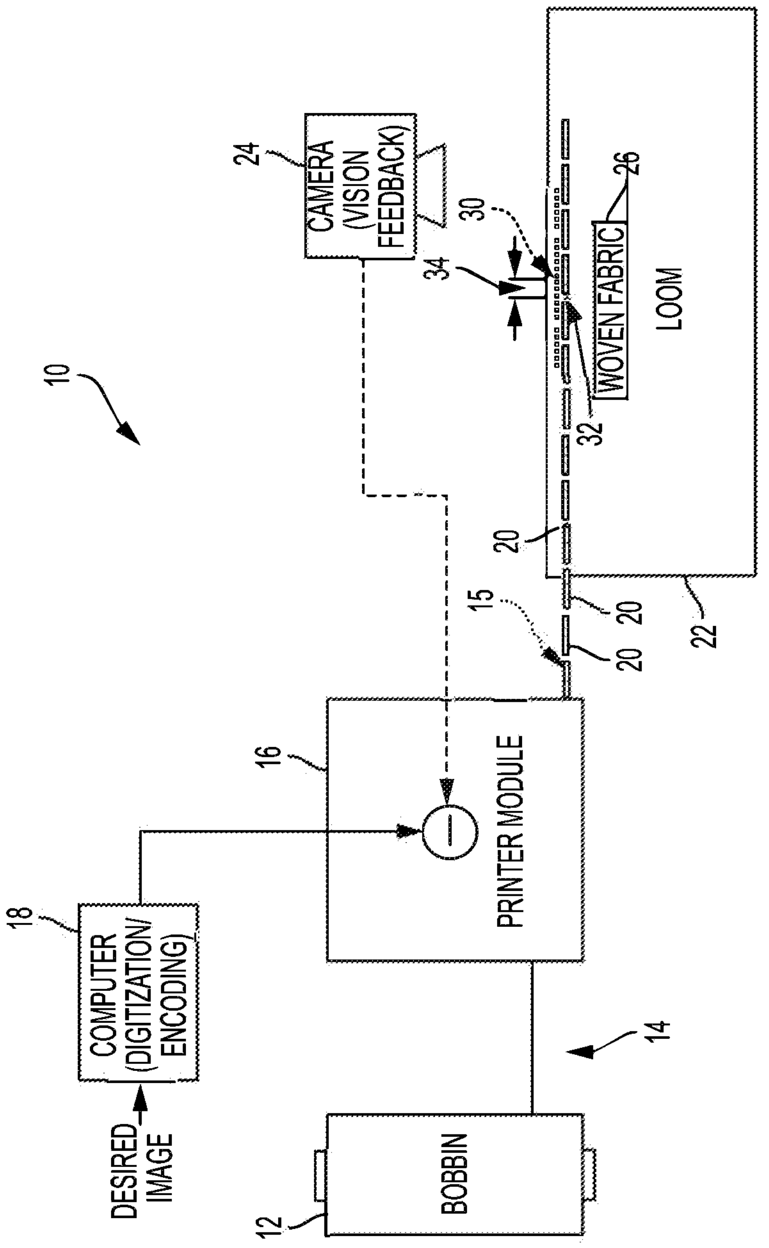
FIG. 1 illustrates a schematic view of a loom weaving system utilizing a weft thread printer module in accordance with an aspect of the disclosure.

As used in this document, the singular forms “a,” “an,” and “the” include plural references unless the context clearly dictates otherwise. Unless defined otherwise, all technical and scientific terms used herein have the same meanings as commonly understood by one of ordinary skill in the art. As used in this document, the term “comprising” (or “comprises”) means “including (or includes), but not limited to.”

In this document, when terms such “first” and “second” are used to modify a noun, such use is simply intended to distinguish one item from another, and is not intended to require a sequential order unless specifically stated.

When used in this document, terms such as “top” and “bottom,” “upper” and “lower”, or “front” and “rear,” are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

The terms "electronic device", "computer", and "computing device" refer to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, mobile electronic devices such as smartphones, Internet-connected wearables, tablet computers, laptop computers, and appliances and other devices that can communicate in an Internet-of-things arrangement. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion below, a client device, server device, virtual machine or container may be referred to simply as a "device" for brevity. Additional elements that may be included in electronic devices will be discussed below in the context of FIG. 9.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, the term "camera" or "imaging device" refers generally to a hardware sensor that is configured to acquire digital images. An imaging device may capture still and/or video images, and optionally may be used for other imagery-related applications. For example, an imaging device can be held by a user such as a DSLR (digital single lens reflex) camera, cell phone camera, or video camera. The imaging device may be part of an image capturing system that includes other hardware components. For example, an imaging device can be mounted on an accessory such as a monopod or tripod. The imaging device can also be mounted on a transporting vehicle such as an aerial drone, a robotic device, or on another mobile electronic device having a transceiver that can send captured digital images to, and receive commands from, other components of the system.

Referring to FIG. 1, a weft thread printing system 10 configured for printing directly on a weft thread is schematically illustrated. As is known in the art, a weft thread is configured to be transported by a shuttle or other device (e.g., a rapier) onto a loom such that the weft thread is woven with a plurality of parallel warp threads to create a fabric. Optionally, the plurality of parallel warp threads may be formed of a single thread positioned to form a plurality of parallel thread segments. The term "thread" used herein may refer to various materials, including (but not limited to) single-strand or multi-strand threads, yarns, and/or monofilaments. As will be described in further detail below, weft thread printing system 10 is configured to provide direct printing on the weft thread such that a single weft thread may incorporate a number of different colors along the thread's length.

As shown in FIG. 1, an extended length of source weft thread 14 is wrapped or otherwise retained on a source such as a cylindrical bobbin 12. The source weft thread 14 may be any appropriate color (e.g., white) which allows for multiple different colors to be visible when applied to the source weft thread 14 by a printing device. While bobbin 12 is shown, it is understood that source weft thread 14 may be stored in other, non-spooled configurations.

As will be described in further detail with respect to FIG. 3, source weft thread 14 is configured to be unspooled from bobbin 12 and fed into a printer module 16. Printer module 16 is capable of printing directly onto source weft thread 14 such that a single strand of source weft thread 14 may be converted to a multi-color weft thread 15, with a plurality of different-colored sectors 20 extending along multi-color weft thread 15. The precise color, length, and position of each sector 20 along multi-color weft thread 15 may vary based on the desired image, pattern, or design, and may be controlled by the processing unit(s) of a computer 18, wherein computer 18 is in communication with printer module 16 through any appropriate wired or wireless means. For example, a desired image, pattern, or design for a finished fabric product may be uploaded or otherwise provided to computer 18, wherein the computer 18 may comprise a processor that executes locally-stored or remotely-stored programming instructions, with the programming instructions being configured to cause the processor to instruct one or more printheads within the printer module 16 to selectively control, e.g., the feed rate of source weft thread 14 through printer module 16 and the precise color, length, and position of each sector 20 along multi-color weft thread 15. Additionally and/or alternatively, printer module 16 may include one or more submodules for the pretreatment and/or post-treatment of the weft thread 14. For example, the one or more submodules (not shown) may apply a pretreatment to the weft thread 14 to better allow the thread to accept ink such as, e.g., preheating the thread. In other configurations, the one or more submodules may apply post-treatment to the thread, such as, e.g., heating the thread for a chemical change, UV polymerization, chemical fixing, etc.

As the multi-color weft thread 15 exits the printer module 16, it is woven with a plurality of parallel-aligned warp threads carried by a loom 22 in order to eventually form a finished woven fabric 26. As will be described further herein, the plurality of warp threads may themselves also be printed in multiple colors along their length in order to achieve the desired image, pattern, or design for the finished fabric 26. Loom 22 may be any appropriate type of loom utilizing weft and warp threads for the formation of woven fabric, such as, e.g., a rapier-shuttle style loom.

In some embodiments, printer module 16 may be coupled to the shuttle or other device which transports the weft thread through loom 22. In this way, printer module 16 may effectively be incorporated into the shuttle or other thread transport device, printing the desired color(s) on the weft thread as the weft thread is moved laterally across the loom 22 and woven with the plurality of warp threads. Alternatively, rather than being coupled directly to the shuttle or other transport device, printer module 16 may be configured to be separate and uncoupled from the shuttle or other transport device, but still track along with the shuttle or other transport device as it moves across the loom 22, printing on the weft thread during this movement. In yet another alternative embodiment, printer module 16 may be configured to remain stationary relative to the shuttle or other transport device, generating the multi-color weft thread 15 prior to weaving and providing the multi-color weft thread 15 to the shuttle or other transport device for the weaving process.

Referring still to FIG. 1, in accordance with some aspects of the disclosure, weft thread printing system 10 may further include a camera 24. Camera 24 may be positioned on or near loom 22 in order to provide vision-based feedback to the printer module 16 and/or computer 18 with respect to the woven fabric 26 and the exact position of the various sectors 20 of multi-color weft thread 15 during a weaving process. In some embodiments, camera 24 may be configured to visually evaluate and compare an actual location of a specific segment of the weft thread against determine whether the actual location corresponds to an expected location. This process may enable the system to detect color misalignment in the woven fabric 26. For example, as the multi-color weft thread 15 is delivered by the shuttle or other transport device and tamped into place after each subsequent pass, the camera 24 may detect the actual color transition position 32 of a particular sector 20 of multi-color weft thread 15 as it is woven into fabric 26. The actual color transition position 32 is a point along multi-color weft thread 15 at which there is a transition in colors, thereby marking a transition between two adjacent sectors 20. This actual color transition position 32 may then be compared against a desired color transition position 30 (with the desired positions demarcated by dotted lines in FIG. 1). While shown as dotted lines in FIG. 1, it is to be understood that the desired color transition position 30 is not necessarily a location of physical presence on or near the loom 22 and/or woven fabric 26. Rather, desired color transition position 30 may be identified by, e.g., a matrix address scheme representative of the desired image, pattern, or design of the fabric 26, which is accessible by the processor of computer 18. In this way, the actual color transition position 32 identified by the camera 24 for a particular weft thread sector transition may be compared to the desired color transition position 30.

Figure 2:
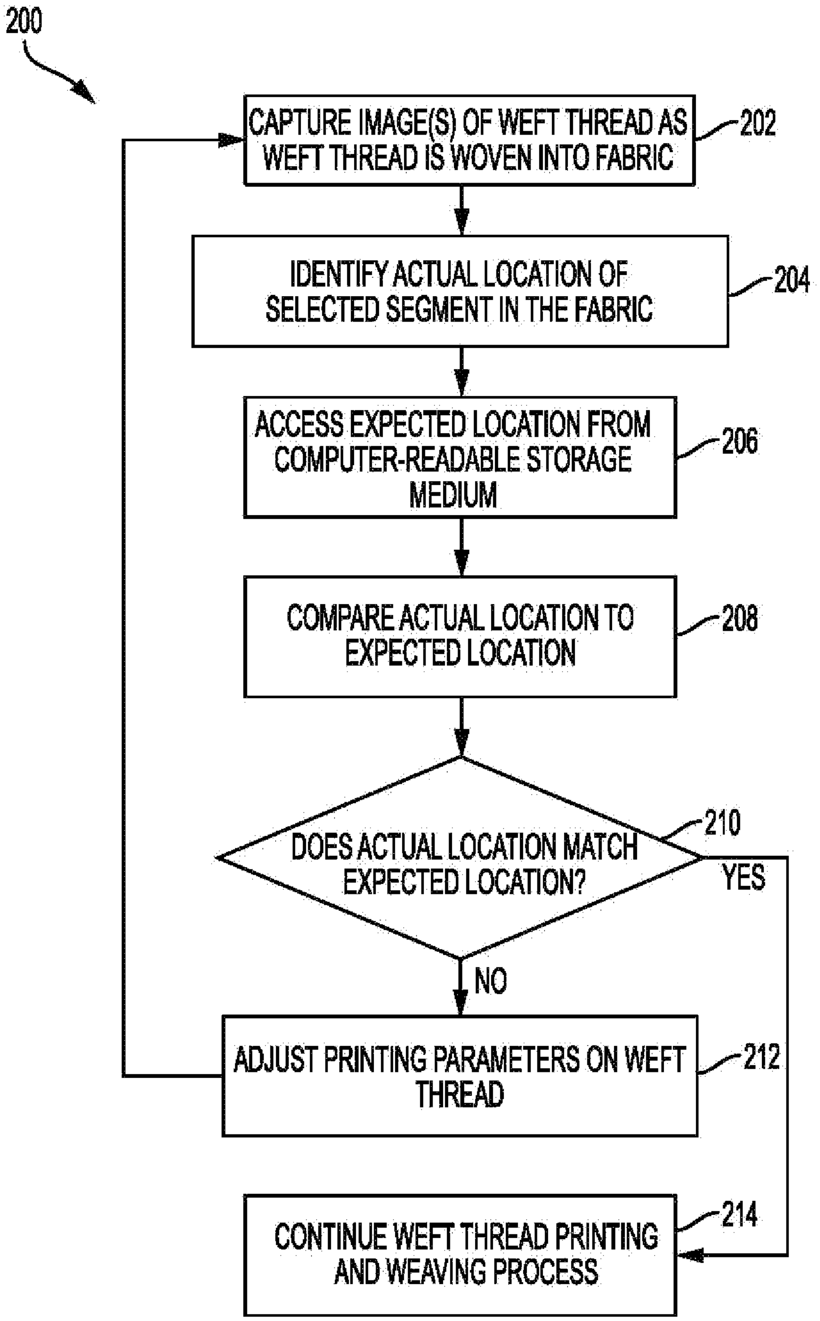
FIG. 2 illustrates a flowchart detailing a camera vision feedback method in accordance with an aspect of the disclosure.

For example, referring to FIG. 2, a flowchart detailing a method of comparing the actual position of a specific segment the weft thread within the woven fabric to an expected position of the weft thread, and making printing parameter adjustments based on this comparison, is shown. The system will contain a computer-readable memory with programming instructions to selectively apply various coatings to the weft thread at specified intervals of various lengths. The system also will include expected location data for at least some of the coated segments after they are woven into the fabric, The printer will apply the coatings to the weft thread and the weft thread may then be woven into fabric as will be described in more detail below in the discussion of FIGS. 3 through 6B. At step 202, an image (or collection of images) of at least a portion of the weft thread is captured by, e.g., camera 24 as the weft thread is woven into the fabric 26. Based on this image(s), an actual location of a selected segment of the weft thread—such as segment that contains a color transition position between at least one set of adjacent, different-colored sectors on the weft thread—in the fabric is identified at step 204. Then, at step 206, the expected location of the selected segment—such as the expected color transition position—is accessed from, e.g., a computer-readable storage medium within or otherwise in communication with computer 18. The expected location is specific to a desired image, pattern, or design of a finished fabric and may be in the form of, e.g., a matrix address scheme.

At step 208, the identified actual location information is compared to the expected location information, and a determination is made (at step 210) whether or not the actual location corresponds to the expected location. Locations may "correspond" in this context if they exactly match, or it they are within a threshold distance (i.e., a tolerance) to permit a very small amount of mismatch. For example, the system may allow for a tolerance by determining whether a starting point or ending point (i.e., a transition location) of the selected segment is within a threshold distance from a target (expected) location in the fabric.

If the actual and expected locations match, the weft thread printing and weaving process continues unchanged at step 214. However, if no, at step 212, printing parameters on the weft thread are adjusted in order to correct the printing locations on the weft thread for at least the next pass of the weft thread through the warp thread(s). For example, referring to FIG. 1, if an actual location of a color transition is 1 cm beyond an expected location in the fabric, the system may adjust the pattern of printing color so that a next segment of the thread that will be printed is decreased in size by 1 cm. The size of one or more segments may thus be increased or decreased, and the application of a desired color at a desired position within the woven fabric 26 may be thus advanced or arrested within printer module 16, so as to correct to the position error 34 in subsequent passes of the multi-color weft thread 15.

Referring back to FIG. 2, after the adjustments to the printing parameters are made at step 212, the process steps are repeated to ensure appropriate alignment between the actual color transition position(s) and the desired color transition position(s). In this way, printing on the multi-color weft thread 15 to produce a desired image, pattern, or design may be highly accurate, with real-time adjustments in printing parameters to account for any misalignment being made possible by vision feedback from camera 24.

As alternative to (or in addition to) the above-described vision-based feedback provided by camera 24 to detect color misalignment of the multi-color weft thread 15, printer module 16 may also be configured to print registration marks, such as a marks using an ultraviolet (UV) coating, at predetermined intervals along the length of multi-color weft thread 15. In such a configuration, camera 24 would include a UV sensor that is capable of sensing UV light, with the UV markings being visible to the camera 24 but not visible to the unaided human eye under ambient light. In some embodiments, the exact locations of the registration markings could be specific to the desired image, pattern, or design of the woven fabric 26. Thus, as the multi-color weft thread 15 is woven by loom 22, the camera 24 may detect possible misalignment of adjacent registration markings, which would also signify possible misalignment between a desired color position and an actual color position of the multi-color weft thread 15. Accordingly, similar to the vision-based feedback described above, the printer module 16 and/or computer 18 may adjust the printing parameters used to generate the various sectors 20 on multi-color weft thread 15 so as to correct for misalignment, but may do so using UV markings instead of (or in addition to) color transitions on the multi-color weft thread 15.

In some embodiments, the warp thread also may include alignment markings, such as a mark that is created with a IR or UV coating and that is positioned at the target location, or other markings that may or may not be visible to the human eye. Then, when determining whether the expected location matches that of a desired location, the system may determine whether the color transition position or registration mark on the weft thread is at or within a threshold distance from the location of an alignment mark on the warp thread.

Figure 3:
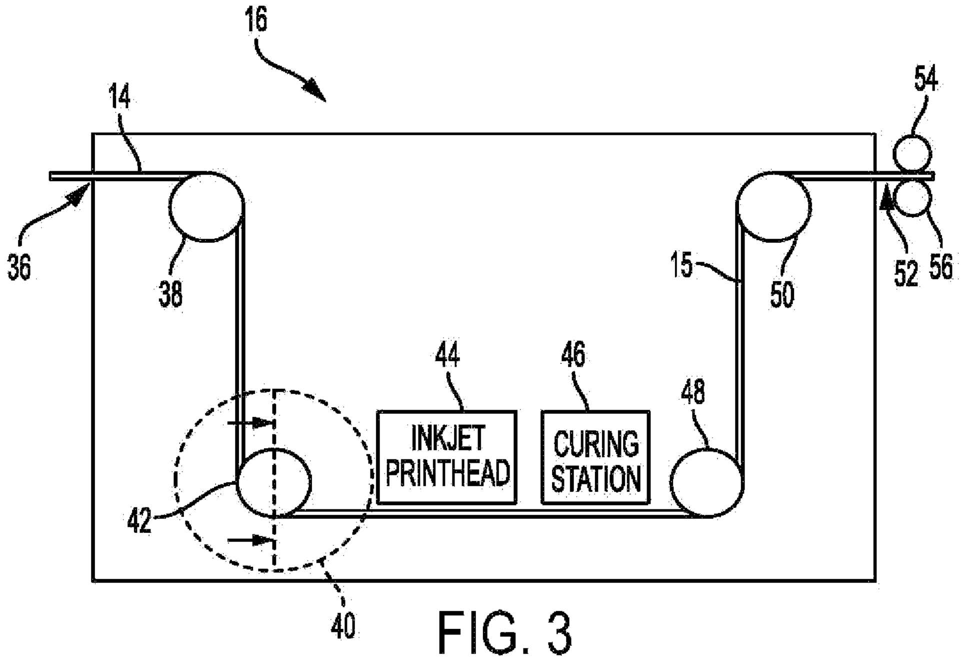
FIG. 3 illustrates the printer module of FIG. 1.

Next, referring to FIG. 3, a schematic view of printer module 16 in accordance with an aspect of the disclosure is shown. As described above with respect to FIG. 1, printer module 16 is configured to receive the source weft thread 14 from a source (e.g., bobbin 12) and print a desired color (or colors) on the source weft thread 14 in order to form a multi-color weft thread 15, wherein the multi-color weft thread 15 is provided to the loom 22 for weaving into a fabric 26 having a desired image, pattern, or color. Specifically, as shown in FIG. 3, printer module 16 includes an intake 36, which directs source weft thread 14, which is typically although not necessarily of a single color, to a first pulley 38. From first pulley 38, source weft thread 14 may be directed downward to a second pulley 42, which is part of a pulley/encoder arrangement 40. Pulley/encoder arrangement 40 will be described in more detail below with respect to FIG. 4.

From second pulley 42, source weft thread 14 passes by (or through) a printhead 44, which is configured to print directly on source weft thread 14 as the source weft thread 14 moves through the printer module 16. The printhead 44 may be, e.g., an inkjet printhead having a CMYK color model, thereby allowing for numerous ink-based colors and color combinations to be applied to the source weft thread 14 from a plurality of ink containers. The wet ink from printhead 44 may either absorb into or surround the outer periphery of source weft thread 14, transforming source weft thread 14 into a multi-color weft thread 15 having printed color(s) visible from all directions. While printhead 44 is shown to be positioned above source weft thread 14, in alternative embodiments, ink may be injected onto the source weft thread 14 from multiple directions.

Printhead 44 will include or will be connected to a set of coatings reservoirs that hold various coatings—such as inks of various different colors—so that the printer can selectively apply desired colors or combinations of colors to the thread as the thread passes by printhead 44. In addition to, or as an alternative to, multi-color inks, printhead 44 may apply functional inks such as thermochromic and/or photochromic inks to source weft thread 14. As is known in the art, thermochromic inks are capable of changing color when temperatures increase/decrease and/or heat is applied. Photochromic inks are capable of changing color (or becoming visible) when subjected to ultraviolet (UV) light and/or sunlight. In this way, the desired image, pattern, or design is not only limited to various colors, but may also incorporate functional features applied via the printhead 44.

After ink is applied to source weft thread 14 to form multi-color weft thread 15, the thread passes beneath or through a curing station 46, which is configured to cure the treated weft thread 15 in the travel path after the printhead 44 applies the coatings (e.g., ink) to the source weft thread 14. In one aspect of the disclosure, the curing station 46 may include a heater and/or a dryer configured to cure the coatings. In another aspect, the curing station 46 may utilize ultraviolet (UV) curing. Regardless of the type of curing used, the curing operation itself may occur quickly (i.e., on the order of milliseconds), thereby allowing the weft thread to travel through the printer module 16 with minimal delay for printing and/or curing.

In an alternative embodiment, rather than an inkjet printhead, printhead 44 may instead be configured for dye sublimation printing, wherein a solid dye of a desired color may be applied to the source weft thread 14 via a piezoelectric printhead, with heat and pressure then being applied by a heat press in order to vaporize the dye and permanently color the weft thread 14 to form the multi-color weft thread 15.

After traveling beyond the curing station 46, multi-color weft thread 15 may be directed across a third pulley 48 and a fourth pulley 50, with multi-color weft thread 15 exiting the printer module 16 through an outlet 52. At or near the outlet 52, an engagement device may be positioned in the travel path of multi-color thread 15, with the engagement device being configured to grip the treated, multi-color weft thread 15 and prevent backlash of the multi-color weft thread 15 in the printer module 16. In one embodiment, the engagement device may be formed by a pair of gripping wheels 54, 56 that touch each other and between which the thread is passed. While shown in FIG. 3 as being positioned external to the printer module 16, it is to be understood that the gripping wheels 54, 56 may instead be disposed within the printer module 16. Furthermore, the engagement device is not limited to gripping wheels, and may be any appropriate mechanism or device capable of preventing backlash of the multi-color weft thread 15.

As illustrated in FIG. 3, both the inlet 36 and the outlet 52 of printer module 16 are vertically offset from the printhead 44 so that the travel path of source weft thread 14 and subsequent multi-color weft thread 15 include at least one section that is vertically higher or lower than a section of the travel path in which the printhead 44 applies the one or more coatings to the weft thread 14, 15 and maintains tension on the weft thread 14, 15 within the printer module 16. The vertically-offset pulleys 38, 42, 48, 50 also cooperate to maintain the tension on weft thread 14, 15. However, it is to be understood that printer module 16 utilize other means of tensioning weft thread 14, 15, and/or the number and placement of pulleys 38, 42, 48, 50 may differ from that which is shown in FIG. 3. By maintaining weft thread 14, 15 in tension, the printing operation from printhead 44, as well as the curing operation from curing station 46, may be done with high accuracy.

Figure 4:
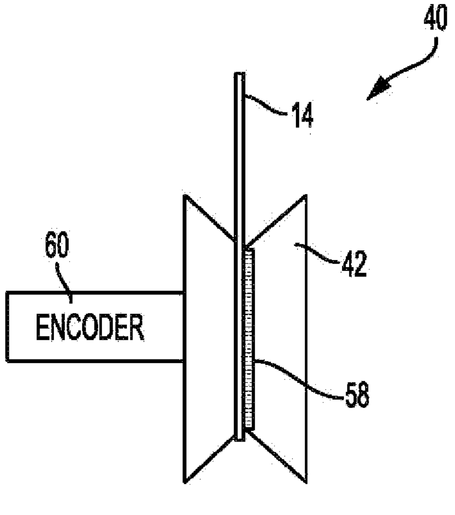
FIG. 4 illustrates a tensioned, centering pulley and encoder for use in conjunction with the printer module of FIG. 1.

Referring now to FIG. 4, pulley/encoder arrangement 40 noted above with respect to FIG. 3 is shown in greater detail. In addition to second pulley 42, pulley/encoder arrangement 40 further includes an encoder device 60, wherein encoder device 60 may be configured as any sensor capable of accurately recording the number of rotations of pulley 42, such as e.g., a shaft encoder. From the recorded number of rotations, a linear distance measurement may be determined, with the linear distance measurement correlating to the travel distance of the source weft thread 14 as it passes through pulley 42. With this linear distance information, the precise position of the source weft thread 14 as it reaches printhead 44 may be determined such that the injection of ink onto source weft thread 14 may be accurately achieved in order to produce a desired image, pattern, or design.

Second pulley 42 may also be configured as a centering pulley, with a high-friction surface 58 (e.g., rubber) formed around the central portion of pulley 42 in order to better ensure accurate rotation of pulley 42 as source weft thread 14 is fed through the printer module 16. While not shown in FIGS. 3-4, pulley/encoder arrangement 40 may be mounted to an adjustable tensioner so as to allow the tension on weft thread 14, 15 to be adjusted. Additionally, while also not shown, one or more of the first pulley 38, the third pulley 48, and the fourth pulley 50 may be configured as a pulley/encoder arrangement similar to pulley/encoder arrangement 40.

Figure 5:
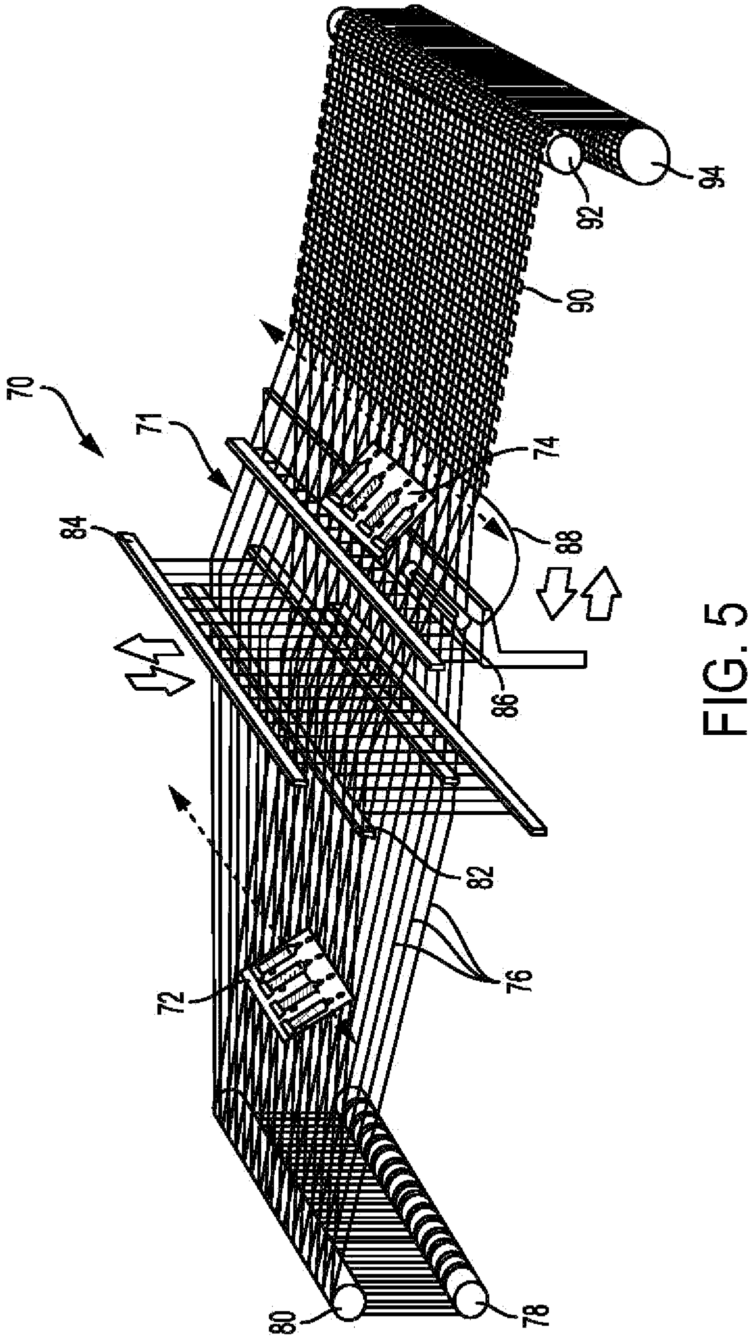
FIG. 5 illustrates a loom configured for warp thread printing in accordance with another aspect of the disclosure.

Next, referring to FIG. 5, a warp thread printing system 70 in accordance with another aspect of the disclosure is shown. While FIGS. 1 and 3-4 describe various systems for printing on a weft thread to be woven into a finished fabric, there may also be a need or desire to print various colors on the warp threads through which the weft thread is woven in order to achieve the desired image, pattern, or design of the finished fabric. Accordingly, warp thread printing system 70 includes a loom 71, wherein loom 71 comprises a warp thread printer module 72 capable of printing directly on a plurality of warp threads 76 as the warp threads 76 are fed through the loom 71. Similar to printer module 40 described above, warp thread printer module 72 may be configured to include at least one inkjet printhead having a CMYK color model, thereby allowing for numerous ink-based colors and color combinations to be applied to the warp threads 76. Additionally, the warp thread printer module 72 may also include a curing station, similar to that described above with respect to FIG. 3. Warp thread printer module 72 may be in wired or wireless communication with a computer (such as, e.g., computer 18), and the computer may comprise a processor and programming instructions, with the programming instructions being configured to cause the processor to instruct one or more printheads within the printer module to selectively apply the plurality colored inks to the warp threads 76 as the printhead moves along the loom 71 so that the warp threads exhibit multiple colors.

In an alternative embodiment, rather than an inkjet printhead, warp thread printer module 72 may instead be configured for dye sublimation printing, wherein a solid dye of a desired color may be applied to the warp thread(s) 76 via a piezoelectric printhead, with heat and pressure then being applied by a heat press in order to vaporize the dye and permanently color the warp thread(s) 76 to form multi-color warp threads to be woven with a multi-color weft thread. The heat press may be part of the warp thread printer module 72, or it may be a separate device.

As shown in FIG. 5, loom 71 includes a warp beam 78 holding and serving as a source to provide a plurality of parallel warp threads 76, with the warp threads 76 being unspooled from warp beam 78 as weaving commences. A tensioning beam 80 may be utilized to provide tension to the warp threads 76, which are respectively moved upward and downward by a pair of heddles 82, 84 in a fashion known in the art. However, before the warp threads reach the heddles 82, 84, the warp thread printer module 72 may print directly upon the warp threads 76, with warp thread printer module 72 being configured to move laterally across the loom 71 in order to apply ink or another coating to the warp threads 76.

The warp thread printing module 72 may include two primary subsystems: a printhead and a motion system. The printhead may be, e.g., an inkjet printing system, such as that which is shown in FIG. 3. However, in other embodiments, the printhead may take the form of, e.g., an extrusion system, an aerosol system, a laser etching system, etc. The printhead may receive triggering signals from separate electronics (e.g., the central processing computer) at given intervals, from encoder pulses as the printhead traverses the loom 71, from a vision-based system, or some combination thereof. While not illustrated in FIG. 5, it is to be understood that the motion system utilized to move the printhead may include a two-axis gantry system, with encoders for positional feedback and triggering (if applicable). The motion system may further include one or more stabilizing guide rods and a motor configured to drive the motion of the printhead utilizing, e.g., a belt, screw, etc.

After warp thread printer module 72 applies desired colors to the warp threads 76, the warp threads 76 are woven with a weft thread 88. In the example shown in FIG. 5, weft thread 88 is shown as being transported by a conventional shuttle 86. However, it is to be understood that other methods of transporting the weft thread 88 may be utilized. Furthermore, it is to be understood that weft thread 88 may be a multi-color thread formed utilizing a system similar to that shown and described above with respect to FIGS. 1 and 3-4.

As the weft thread 88 is woven with the warp threads 76, a fabric 90 is formed, with the fabric 90 having a designed image, pattern, or design thereon. The finished fabric 90 is then rolled across a tension beam 92 onto a fabric beam 94.

In addition to (or alternatively to) the warp thread printer module 72 located before heddles 82, 84 in the path of the warp threads 76, warp thread printing system 70 may include a warp thread printer module 74 that is positioned after the heddles 82, 84 to apply ink to the warp threads after the warp threads pass through the heddles 82, 84. Unlike the first warp thread printer module 72, the second warp thread printer module 74 may be located at or near the location of the shuttle 86 such that the warp threads 76 are colored nearly in conjunction with the weaving (and printing) of weft thread 88. Warp thread printer module 74 may also travel laterally across loom 71 in order to accurately print upon warp threads 76. As with the first warp thread printer module a heat press may be part of the second warp thread printer module 74, or it may be provided a separate device, in embodiments that include a heat press. Furthermore, while biaxial weaving is described and illustrated in FIG. 5, it is to be understood that the thread printing systems and methods described herein are not limited as such, and may apply to other configurations such as, e.g., triaxial weaving.

Figure 6A:
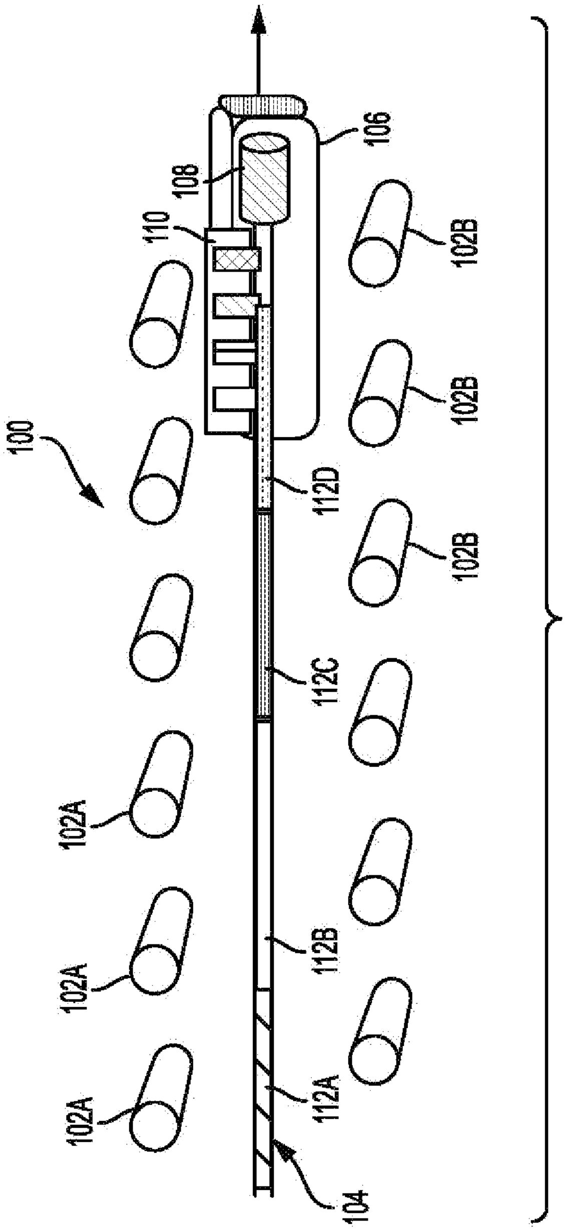
FIG. 6A illustrates a weft thread printing configuration in a first position in accordance with another aspect of the disclosure.
Figure 6B:
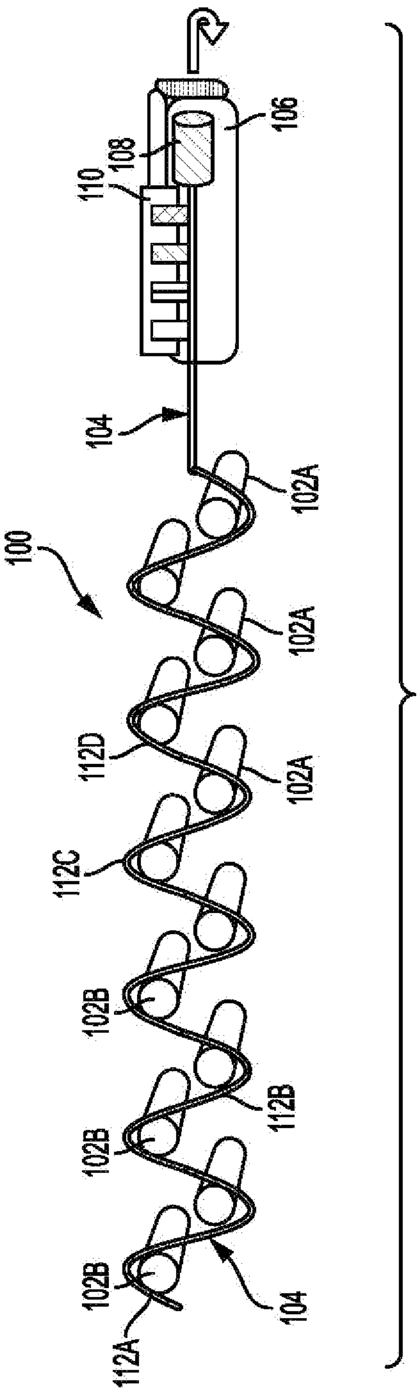
FIG. 6B illustrates the weft thread printing configuration of FIG. 6A in a second position.

Referring now to FIGS. 6A-6B, a schematic view of a weft thread printing system 100 in accordance with an aspect of the disclosure is shown. As shown in FIG. 6A, a plurality of "up" warp threads 102A and a plurality of "down" warp threads 102B are separated during the weaving process, thereby allowing a weft thread 104 to travel between the warp threads 102A, 102B by way of a shuttle 106. The weft thread 104 is carried by a thread spool 108, which itself is carried by the shuttle 106. In this way, a source weft thread 104 unravels from thread spool 108 as the shuttle 106 moves between the respective warp threads 102A, 102B.

Also carried by (or in conjunction with) shuttle 106 is a weft thread printer 110. The weft thread printer 110 may include an inkjet printhead having a CMYK color model, thereby allowing for numerous ink-based colors and color combinations to be applied to the source weft thread 104 from a plurality of ink containers. Alternatively, weft thread printer 110 may apply color via another method, e.g., dye sublimation. As the weft thread 104 is unspooled from thread spool 108, the weft thread printer 110 applies ink or another coating to weft thread 104 so as to form a plurality of different-colored sectors 112A, 112B, 112C, 112D along the length of weft thread 104.

As shown in FIG. 6B, as the plurality of "up" warp threads 102A and a plurality of "down" warp threads 102B are inverted by the conventional movement within the loom, the source weft thread 104 is woven into the warp threads 102A, 102B such that the different-colored sectors 112A, 112B, 112C, 112D are precisely placed in the woven fabric, with the weft thread 104 being fully surrounded by the desired colors so as to avoid inconsistencies when the woven fabric is stretched or viewed from an opposite side. Furthermore, while not shown in FIGS. 6A-6B, it is also possible for the respective warp threads 102A, 102B to be printed upon using, for example, as system and method as shown and described above with respect to FIG. 5.

Figure 7:
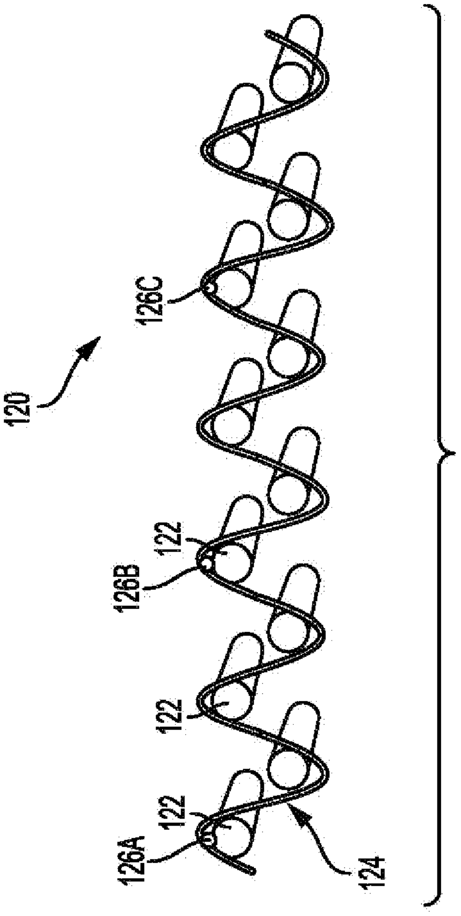
FIG. 7 illustrates a weft and warp thread adhesive printing configuration in accordance with another aspect of the disclosure.

Next, referring to FIG. 7, a weft thread printing system 120 in accordance with another aspect of the disclosure is illustrated. Similar to the weft thread printing system 100 described above with respect to FIGS. 6A-6B, weft thread printing system 120 includes a weft thread 124 having a plurality of different-colored, printed sectors woven amongst a plurality of warp threads 122, thereby providing for precise color placement within a woven fabric.

However, weft thread printing system 120 may further include a means for printing or otherwise applying an adhesive at select cross-points between the weft thread 124 and the warp threads 122. For example, adhesives 126A, 126B, 126C shown in FIG. 7 may be applied at select cross-points, with the type of adhesive being any appropriate adhesive capable of secure application to threaded materials. The purpose of the adhesives 126A, 126B, 126C is to bind the weft thread 124 and warp threads 122 together at particular cross-points, thereby fixing any image, pattern, or design formed by the multi-color woven threads and avoiding any distortion of the image, pattern, or design caused by misaligned or stretched fabric.

While not shown in FIG. 7, it is to be understood that the adhesives 126A, 126B, 126C may be applied in conjunction with printing by either a weft thread printer (such as, e.g., printer module 16 shown and described with respect to FIGS. 1 and 3-4) and/or a warp thread printer (such as, e.g., warp thread printer module 72 shown and described with respect to FIG. 5). That is, the weft thread printer and/or the warp thread printer may include one or more containers holding an adhesive, as well as a means for applying an adhesive (e.g., an injector) at various cross-points in conjunction with, or directly subsequent to, the color printing step on the weft and/or warp threads. Furthermore, while FIG. 7 illustrates adhesives 126A, 126B, 126C being applied at select cross-points of the weft thread 124 with warp threads 122, it is to be understood that adhesives may be printed/applied at more or fewer cross-points within the fabric.

Figure 8:
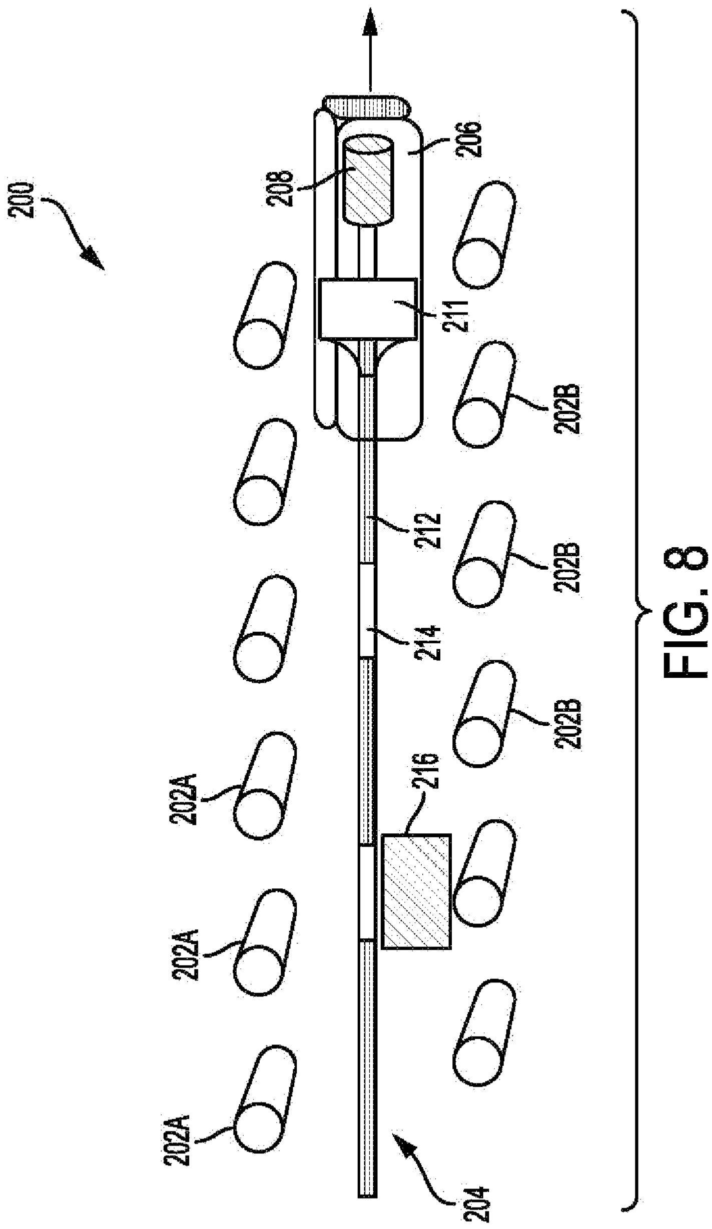
FIG. 8 illustrates a weft thread printing configuration utilizing electrically-conductive wire or optic fiber in accordance with another aspect of the disclosure.

Next, referring to FIG. 8, a schematic view of a weaving system 200 in accordance with an alternative aspect of the disclosure is shown. Unlike the weft thread printing system 100 described above with respect to FIGS. 6A-6B, which pertains to inkjet printing on a fiber-based weft thread 104, weaving system 200 pertains to a system in which a traditional weft thread is replaced with electrically-conductive wires and/or optic fibers, which are themselves interwoven into a fabric. As shown in FIG. 8, a plurality of "up" warp threads 202A and a plurality of "down" warp threads 202B are separated during the weaving process, as described above, thereby allowing an electrically-conductive wire 204 (or, alternatively, an optic fiber) to travel between the warp threads 202A, 202B by way of a shuttle 206. The electrically-conductive wire 204 may be stored on board the shuttle 206 via, e.g., a spool 208. In this way, the electrically-conductive wire 204 unravels as the shuttle 206 moves between the respective warp threads 202A, 202B.

Also carried by (or in conjunction with) shuttle 206 is an extrusion device 211, wherein extrusion device 211 is capable of extruding a coating 212 on the electrically-conductive wire 204 as the wire 204 is drawn from shuttle 206 during weaving. In the case of wire 204 being an electrically-conductive wire, the coating 212 may be an electrically-insulating coating. However, if wire 204 were, e.g., an optic fiber, the extruded coating 212 may be, e.g., a cladding layer.

Application of the coating 212 by extrusion device 211 may be controlled such that one or more gaps 214 are formed between layers of coating 212, thereby exposing an uncoated section of electrically-conductive wire 204 (or, in other embodiments, an uncoated section of optic fiber). Such an exposed section of wire 204 may enable signal input/output into the woven fabric. In some embodiments, a sensor material 216 may be interwoven into the woven fabric at precise locations in-line with the gaps 214 formed between the layers of coating 212, allowing for signal input/output from sensor material 216 to/from the wire 204 at these gap locations. The locations of the sensor material 216 may be matrix-addressed such that the formation of gaps 214 by the extrusion device 211 during weaving coincides with the locations of sensor material 216. Additionally and/or alternatively, in other embodiments, the extrusion device 211 itself may not form the gaps 214. Instead, an inkjet printer device (not shown) on board shuttle 206 may apply an etching agent at a desired location of gaps 214 so as to create the desired gaps 214 after a coating 212 is applied to the wire 204.

Figure 9:
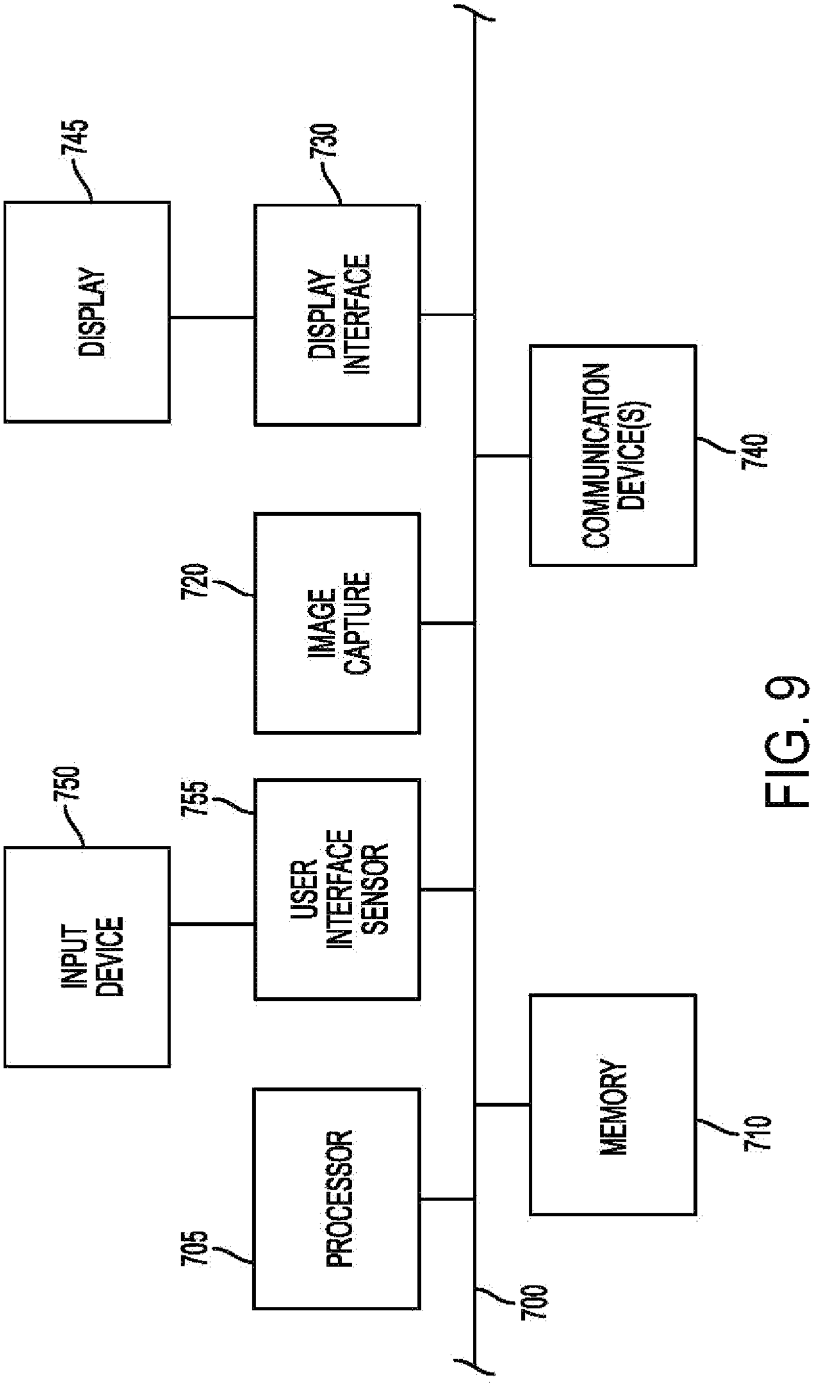
FIG. 9 depicts various embodiments of one or more electronic devices for implementing the various methods and processes described herein.

FIG. 9 depicts an example of internal hardware that may be included in any of the electronic components of the system, such as the user's smartphone or a local or remote computing device in the system. An electrical bus 700 serves as an information highway interconnecting the other illustrated components of the hardware. Processor 705 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 710. A memory device may include a single device or a collection of devices across which data and/or instructions are stored.

An optional display interface 730 may permit information from the bus 700 to be displayed on a display device 745 in visual, graphic or alphanumeric format. An audio interface and audio output (such as a speaker) also may be provided. Communication with external devices may occur using various communication devices 740 such as a wireless antenna, an RFID tag and/or short-range or near-field communication transceiver, each of which may optionally communicatively connect with other components of the device via one or more communication system. The communication device 740 may be configured to be communicatively connected to a communications network, such as the Internet, a local area network or a cellular telephone data network.

The hardware may also include a user interface sensor 755 that allows for receipt of data from input devices 750 such as a keyboard, a mouse, a joystick, a touchscreen, a touch pad, a remote control, a pointing device, a video input device and/or an audio input device. Data also may be received from an image capturing device 720, such of that a scanner or camera.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A system for treatment of thread, comprising:
a weft thread printer that comprises:
an intake positioned to receive a weft thread from a source,
an encoder that is configured to detect a length of the weft thread as the weft thread moves through the weft thread printer along a travel path,
a printhead positioned to apply coatings of a plurality of colors to the weft thread and yield a treated weft thread,
a pretreatment module positioned and configured to preheat the weft thread before the weft thread reaches the printhead, and
an outlet positioned to pass the treated weft thread to a loom.

2. The system of claim 1, further comprising an engagement device that is positioned in the travel path after the printhead and that is configured to grip the treated weft thread and prevent backlash of the treated weft thread in the weft thread printer.

3. The system of claim 2, wherein the engagement device comprises a pair of gripping wheels.

4. The system of claim 1, further comprising a curing station that is positioned to cure the treated weft thread in the travel path after the printhead applies the coatings to the weft thread.

5. The system of claim 4, wherein the curing station comprises an ultraviolet light source or a heater.

6. The system of claim 1 wherein:
the printhead comprises a piezoelectric printhead;
the weft thread printer further comprises a heat press; and
the printhead and heat press are configured to apply the coatings to the weft thread via dye-sublimation printing.

7. The system of claim 1, wherein the encoder comprises:
a pulley that contains a channel that is configured to receive and pass the weft thread; and
a sensor system configured to record rotations of the pulley and convert the recorded rotations into a linear distance measurement.

8. The system of claim 7, wherein the pulley further comprises a high-friction surface formed around a central portion of the pulley.

9. The system of claim 1, wherein the outlet and the intake are vertically offset from the printhead so that the travel path includes at least one section that is vertically higher or lower than a section of the travel path in which the printhead applies one or more of the coatings to the weft thread and maintains tension on the weft thread in the system.

10. The system of claim 1 further comprising the loom, and wherein the loom comprises:
one or more warp threads; and
a shuttle that is configured to receive the treated weft thread from the outlet and weave the treated weft thread through the one or more warp threads.

11. The system of claim 10, wherein the weft thread printer is coupled to the shuttle.

12. The system of claim 1, further comprising a processor and programming instructions, and wherein:
the printhead comprises a plurality of ink containers;
the coatings of a plurality of colors comprise a plurality of colored inks; and
the programming instructions are configured to cause the processor to instruct the printhead to selectively apply the colored inks to the weft thread as the weft thread travels along the travel path so that the treated weft thread exhibits multiple colors.

13. The system of claim 12 further comprising a camera to record an actual location of the treated weft thread.

14. The system of claim 13, wherein the programming instructions are further configured to compare the actual location of the treated weft thread to an expected location of the treated weft thread.

15. The system of claim 14, wherein the programming instructions are further configured to adjust at least one printing parameter when the actual location is different from the expected location.

16. The system of claim 1, wherein the coatings further include at least one of a thermochromic ink and a photochromic ink.

17. The system of claim 1, wherein:
the weft thread printer further comprises an adhesive container that holds an adhesive; and
the printhead is also configured to apply the adhesive to the weft thread at a plurality of binding points at which the weft thread will adhere to one or more warp threads.

18. The system of claim 12, wherein the programming instructions are further configured to selectively control a feed rate of the weft thread.

19. The system of claim 1, wherein:
the plurality of coatings comprise at least one coating that is an ultraviolet (UV) coating or infrared (IR) coating; and
the printer also includes a processor and programming instructions that are configured to cause the printer to print registration marks or alignment marks using the UV coating or IR coating on the thread at a plurality of intervals along the weft thread.

* * * * *